J. WEATHERS.
Wheel for Vehicles.
No. 112,099.
Patented Feb 21, 1871.
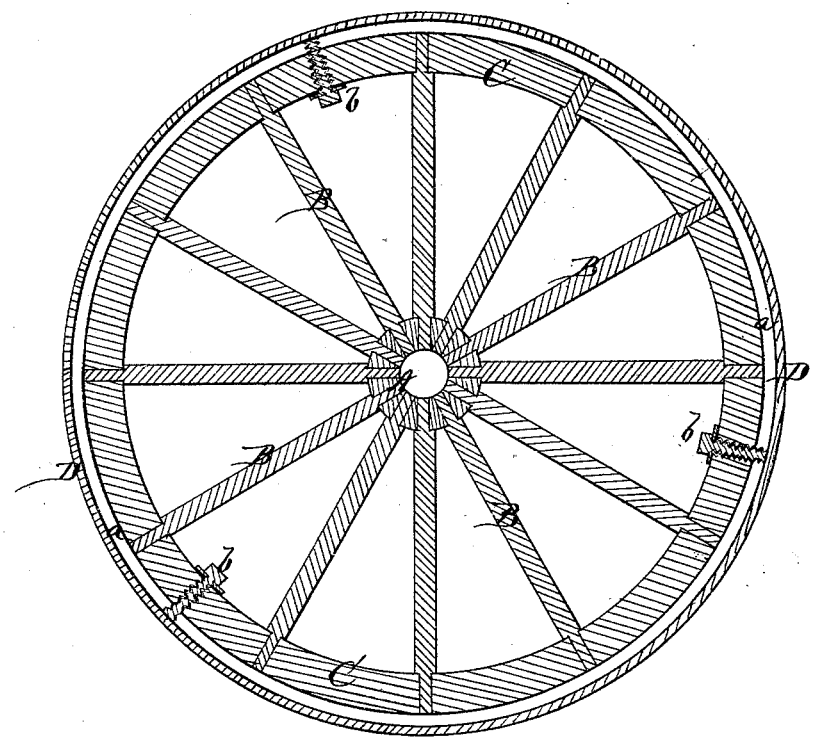
WITNESSES
INVENTOR
James Weathers

UNITED STATES PATENT OFFICE.

JAMES WEATHERS, OF GREENSBURG, INDIANA.

IMPROVEMENT IN WHEELS FOR VEHICLES.

Specification forming part of Letters Patent No. 112,099, dated February 21, 1871.

*To all whom it may concern:*

Be it known that I, JAMES WEATHERS, of Greensburg, in the county of Decatur, and in the State of Indiana, have invented certain new and useful Improvements in Wheels for Vehicles; and I do hereby declare that the following is a full, clear, and exact description thereof, reference being had to the accompanying drawings, and to the letters of reference marked thereon, making a part of this specification.

The nature of my invention consists in providing the tire of the wheel with a continuous groove on the inside, and fastening it onto the wheel by set-screws passing from the inside through the rim of the wheel, and their points coming into the groove in the tire.

In order to enable others skilled in the art to which my invention appertains to make and use the same, I will now proceed to describe its construction and operation, referring to the annexed drawings, in which—

Figure 1 is a longitudinal vertical section of my wheel; and Figs. 2 and 3 are transverse vertical sections through the rim and tire, showing the groove and set-screw.

A represents the hub, B B the spokes, and C the rim, of a wheel made in any of the known and usual ways.

D represents the tire, which is provided on its inner side with a continuous groove, *a*. This tire being put on the wheel, set-screws *b b* are passed from the inside through the rim C, their points projecting beyond the rim into the groove *a*, and thus the tire is prevented from slipping off the wheel. When it is necessary to take off the tire, merely loosen or unscrew the set-screws *b b* till their points are withdrawn from the groove *a*, and the tire can be easily removed.

In the usual mode of fastening tires there are holes for bolts through the tire and the rim of the wheel. Then in resetting the tire these holes do not always come opposite each other, necessitating the making of new holes in the rim, thereby weakening the wheel. By my method it does not matter where the tire is put on. The set-screws fit at any point.

Having thus fully described my invention, what I claim as new, and desire to secure by Letters Patent, is—

The combination of the tire D, provided with a continuous groove on its inner side, with the set-screws *b*, passing through the fellies C and securing the tire, all as shown and described.

In testimony that I claim the foregoing I have hereunto set my hand this 27th day of September, 1870.

JAMES WEATHERS.

Witnesses:
EDWARD SPEER,
ROBERT HAZELRIGG.